United States Patent
Micusik et al.

(10) Patent No.: US 12,260,567 B2
(45) Date of Patent: Mar. 25, 2025

(54) 3D SPACE CARVING USING HANDS FOR OBJECT CAPTURE

(71) Applicant: Snap Inc., Santa Monica, CA (US)

(72) Inventors: Branislav Micusik, St. Andrae-Woerdern (AT); Georgios Evangelidis, Vienna (AT); Daniel Wolf, Mödling (AT)

(73) Assignee: Snap Inc., Santa Monica, CA (US)

(*) Notice: Subject to any disclaimer, the term of this patent is extended or adjusted under 35 U.S.C. 154(b) by 280 days.

(21) Appl. No.: 17/973,167

(22) Filed: Oct. 25, 2022

(65) Prior Publication Data

US 2024/0135555 A1    Apr. 25, 2024
US 2024/0233144 A9    Jul. 11, 2024

(30) Foreign Application Priority Data

Sep. 1, 2022 (GR) ............................ 20220100720

(51) Int. Cl.
*G06T 7/292* (2017.01)
*G06F 3/01* (2006.01)
(Continued)

(52) U.S. Cl.
CPC .............. *G06T 7/292* (2017.01); *G06F 3/011* (2013.01); *G06T 7/564* (2017.01); *G06T 19/006* (2013.01);
(Continued)

(58) Field of Classification Search
CPC ...................... G06T 7/292; G06T 7/564; G06T 2207/10012; G06T 2207/10028;
(Continued)

(56) References Cited

U.S. PATENT DOCUMENTS 8,073,198 B2    12/2011   Marti
9,639,943 B1*    5/2017   Kutliroff ................... G06T 7/55
(Continued)

FOREIGN PATENT DOCUMENTS

EP           2956843        8/2019
WO        2022040954        3/2022
WO   WO-2022040954 A1 *    3/2022

OTHER PUBLICATIONS

Kutulakos, Kiriakos N., and James R. ValliNo. "Calibration-free augmented reality." IEEE Transactions on Visualization and Computer Graphics 4, No. 1 (1998): 1-20. (Year: 1998).*

(Continued)

*Primary Examiner* — King Y Poon
*Assistant Examiner* — Vincent Peren
(74) *Attorney, Agent, or Firm* — Schwegman Lundberg & Woessner, P.A.

(57) ABSTRACT

A method for carving a 3D space using hands tracking is described. In one aspect, a method includes accessing a first frame from a camera of a display device, tracking, using a hand tracking algorithm operating at the display device, hand pixels corresponding to one or more user hands depicted in the first frame, detecting, using a sensor of the display device, depths of the hand pixels, identifying a 3D region based on the depths of the hand pixels, and applying a 3D reconstruction engine to the 3D region.

20 Claims, 12 Drawing Sheets

(51) Int. Cl.
    *G06T 7/564*  (2017.01)
    *G06T 19/00*  (2011.01)
    *G06V 20/64*  (2022.01)

(52) U.S. Cl.
    CPC .... *G06V 20/64* (2022.01); *G06T 2207/10012* (2013.01); *G06T 2207/10028* (2013.01); *G06T 2210/56* (2013.01)

(58) Field of Classification Search
    CPC ..... G06T 2210/56; G06V 20/64; G06F 3/011; G06F 3/014; G06F 3/017
    See application file for complete search history.

(56) References Cited

U.S. PATENT DOCUMENTS

| | | | |
|---|---|---|---|
| 10,706,584 B1* | 7/2020 | Ye | G06F 18/214 |
| 2017/0242492 A1* | 8/2017 | Horowitz | G06F 3/017 |
| 2018/0173404 A1* | 6/2018 | Smith | G06F 3/017 |

OTHER PUBLICATIONS

Michel, Damien, Xenophon Zabulis, and Antonis A. Argyros. "Shape from interaction." Machine Vision and Applications 25 (2014): 1077-1087. (Year: 2014).*

Tzionas, Dimitrios, and Juergen Gall. "3d object reconstruction from hand-object interactions." In Proceedings of the IEEE International Conference on Computer Vision, pp. 729-737. 2015. (Year: 2015).*

Ye Y, Gupta A, Tulsiani S. What's in your hands? 3D Reconstruction of Generic Objects in Hands. In2022 IEEE/CVF Conference on Computer Vision and Pattern Recognition (CVPR) Jun. 18, 2022 (pp. 3885-3895). IEEE. (Year: 2022).*

Machine translation of WO 2022/040954 (Year: 2022).*

"International Application Serial No. PCT/US2023/073217, International Search Report mailed Dec. 13, 2023", 5 pgs.

"International Application Serial No. PCT/US2023/073217, Written Opinion mailed Dec. 13, 2023", 11 pgs.

Kim, N H, "A Contour-Based Stereo Matching Algorithm Using Disparity Continuity", Pattern Recognition, Elsevier, GB, vol. 21, No. 5, (Jan. 1, 1988), 505-514.

* cited by examiner

3D SPACE CARVING USING HANDS FOR OBJECT CAPTURE

CLAIM OF PRIORITY

This application claims the benefit of priority to Greece Patent Application Serial No. 20220100720, filed Sep. 1, 2022, which is incorporated herein by reference in its entirety.

TECHNICAL FIELD

The subject matter disclosed herein generally relates to a 3D model system. Specifically, the present disclosure addresses systems and methods for limiting a 3D space using hand motion.

BACKGROUND

Acquiring the 3D geometry of real-world objects is generally known in the art. In computer vision, image-based scene reconstruction techniques are used to create a 3D model of a scene, given a set of 2D images of the scene. In one 3D reconstruction technique, a system analyzes images of the scene using multi-view stereo. These image-based methods can construct a 3D model relatively simply and cheaply by employing standard imaging hardware like consumer digital cameras. These image-based methods can provide color information of the scene and offer high resolution scanning thanks to the advances in image sensors. Most multi-view stereo methods filter, smooth, or denoise the reconstructed depth maps, and often these steps are integrated into the depth estimation stage and formulated as a (global) optimization problem.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
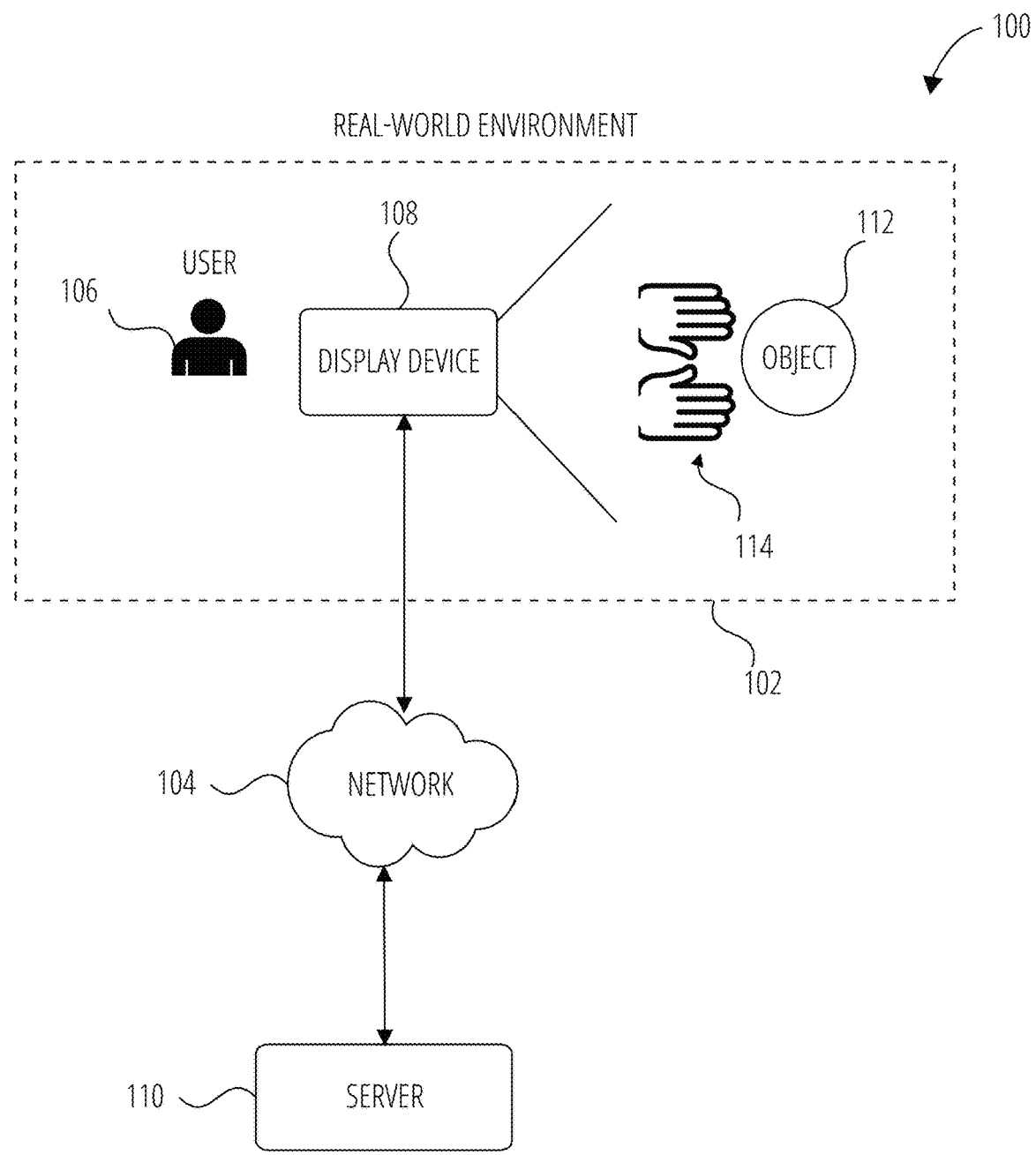
FIG. 1 is a block diagram illustrating a network environment for operating an AR display device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

A wearable device, such as smart glasses, can be used to estimate a 3D model of a physical object based on point cloud data generated by the sensors in the wearable device. The wearable device can employ multi-view stereo methods for constructing the 3D model by first computing camera poses and then estimating depth maps for all views by finding corresponding pixels between views and triangulating depth. Under that approach, all pixels are then projected into 3D space to obtain a point cloud from which a surface mesh can be extracted using point cloud meshing techniques. However, a drawback of the approach described above is that processing all pixels in the images to generate the point cloud consume limited processing resources, especially on a mobile device such as a smartphone or mixed reality glasses.

The present application describes a method for tracking hands of a user of the wearable device to carve out a 3D space for a 3D reconstruction engine to focus on. In other words, regions outside the carved out 3D space are not considered by the 3D reconstruction engine. In one example embodiment, the user of the wearable device walks to a nearby physical object and moves his/her hands in front, behind, and on the side of the physical object. The wearable device operates a hand tracking algorithm on the images generated by the wearable device. The hand tracking algorithm labels/segments pixels in the images belonging to the hand(s). The wearable device determines the depths of these pixels based on (1) a stereo or depth camera of the wearable device, or (2) contour matching of the tracked hands in two images. These pixels indicate an unoccupied 3D space between a camera of the wearable device and the hand(s). The presently described method results in a lower power consumption of the wearable device in generating/identifying a 3D envelope/hull of a physical object to be 3D reconstructed because the 3D reconstruction engine would only need to resolve occupancy of the voxels in a smaller region instead of the entire 3D space depicted in the images. Furthermore, unlike background removal methods that only work with a single foreground object, with the presently described method, the user can carve the hull of any physical object depicted in cluttered scenes.

In one example embodiment, a method for carving a 3D space using hands tracking for 3D capture of a physical object is described. In one aspect, a method includes accessing a first frame from a camera of a display device, tracking, using a hand tracking algorithm operating at the display device, hand pixels corresponding to one or more user hands depicted in the first frame, detecting, using a sensor of the display device, depths of the hand pixels, identifying a 3D region based on the depths of the hand pixels, and applying a 3D reconstruction engine to the 3D region.

As a result, one or more of the methodologies described herein facilitate solving the technical problem of limited computation resources on a mobile device. The presently described method provides an improvement to an operation of the functioning of a computer by reducing power consumption related to 3D capture of a physical object using a camera of a mobile device. As such, one or more of the methodologies described herein may obviate a need for certain efforts or computing resources. Examples of such computing resources include Processor cycles, network traffic, memory usage, data storage capacity, power consumption, network bandwidth, and cooling capacity.

FIG. 1 is a network diagram illustrating a network environment 100 suitable for operating a display device 108, according to some example embodiments. The network environment 100 includes a display device 108 and a server 110, communicatively coupled to each other via a network 104. The display device 108 and the server 110 may each be implemented in a computer system, in whole or in part, as described below with respect to FIG. 12. The server 110 may be part of a network-based system. For example, the network-based system may be or include a cloud-based server system that provides additional information, such as virtual content (e.g., three-dimensional models of virtual objects) to the display device 108.

A user 106 operates the display device 108. The user 106 may be a human user (e.g., a human being), a machine user (e.g., a computer configured by a software program to interact with the display device 108), or any suitable combination thereof (e.g., a human assisted by a machine or a machine supervised by a human). The user 106 is not part of the network environment 100, but is associated with the display device 108.

The display device 108 can include a computing device with a display such as a smartphone, a tablet computer, or a wearable computing device (e.g., watch or glasses). The computing device may be hand-held or may be removably mounted to a head of the user 106. In one example, the display may be a screen that displays what is captured with a camera of the display device 108. In another example, the display of the display device 108 may be transparent such as in lenses of wearable computing glasses. In another example embodiment, the display may be non-transparent and wearable by the user 106 to cover the field of vision of the user 106.

The display device 108 includes a tracking system (not shown). The tracking system tracks the pose (e.g., position and orientation) of the display device 108 relative to the real-world environment 102 using optical sensors (e.g., depth-enabled 3D camera, image camera), inertial sensors (e.g., gyroscope, accelerometer), wireless sensors (Bluetooth, Wi-Fi), GPS sensor, and audio sensor to determine the location of the display device 108 within the real-world environment 102. In another example embodiment, the tracking system tracks the pose of the hands 114 in video frames captured by the camera. For example, the tracking system recognizes hands 114 and tracks a motion of the hands 114. The user 106 can move his/her hands 114 in front, behind, on the sides of a physical object 112.

The display device 108 includes a 3D reconstruction engine (not shown) configured to construct a 3D model of the physical object 112 based on the depths of the tracked hands 114. The display device 108 can use the 3D model to identify the physical object 112 and to operate an application using the 3D model. For example, the application may include an AR (Augmented Reality) application configured to provide the user 106 with an experience triggered by the physical object 112. For example, the user 106 may point a camera of the display device 108 to capture an image of the physical object 112. The display device 108 then tracks the physical object 112 and accesses virtual content associated with the physical object 112. In one example, the AR application generates additional information corresponding to the 3D model of the physical object 112 and presents this additional information in a display of the display device 108. If the 3D model is not recognized locally at the display device 108, the display device 108 downloads additional information (e.g., other 3D models) from a database of the server 110 over the network 104.

In one example embodiment, the server 110 receives the depths data of a carved out 3D space and applies a 3D reconstruction engine to the depths data of the carved out 3D space to construct a 3D model of the physical object 112. The server 110 can also identify virtual content (e.g., a virtual object) based on the 3D model of the physical object 112. The server 110 communicates the virtual object back to the display device 108. The object recognition, tracking, and AR rendering can be performed on either the display device 108, the server 110, or a combination between the display device 108 and the server 110.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 5 to FIG. 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 110), databases, and devices (e.g., display device 108). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
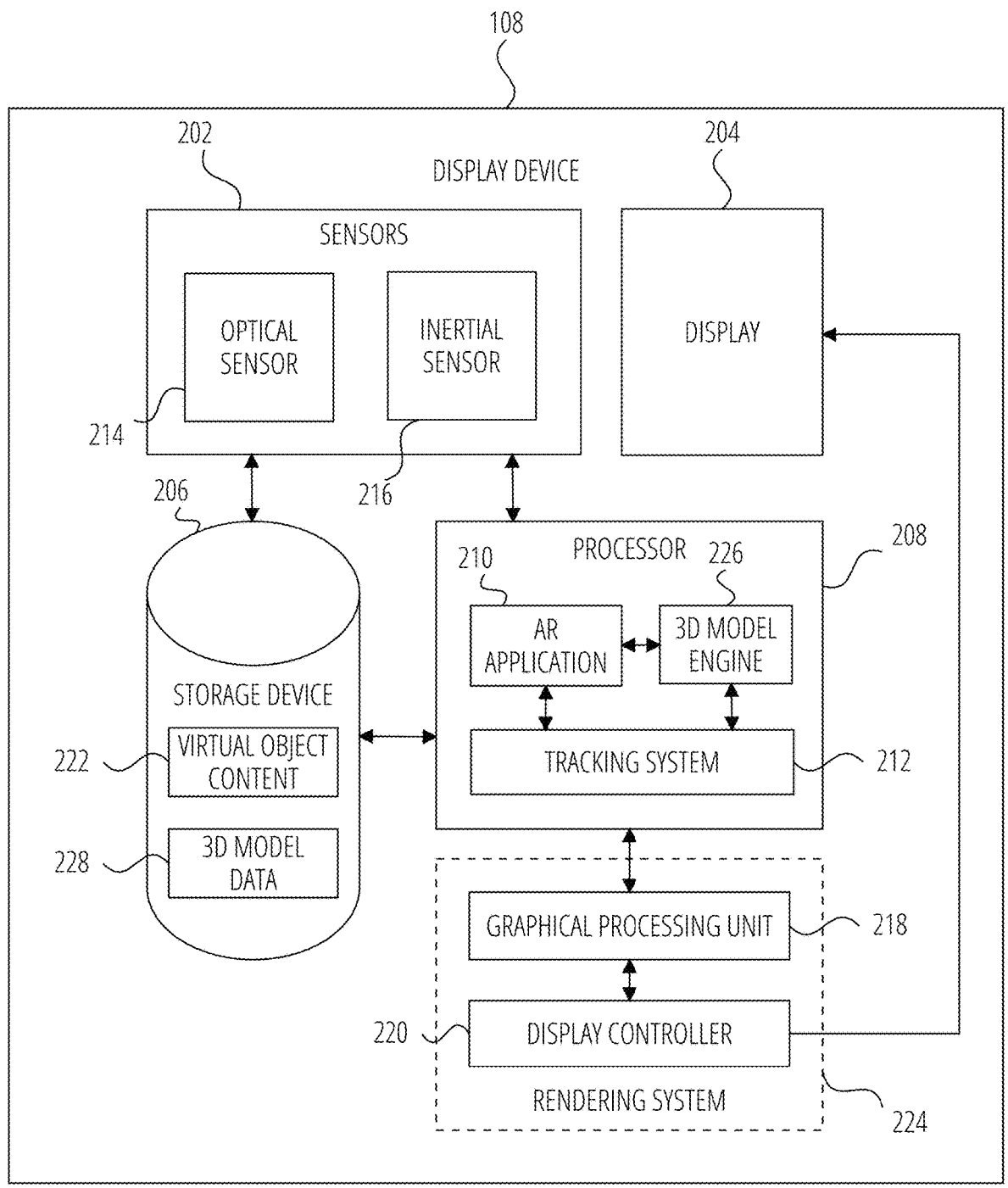
FIG. 2 is a block diagram illustrating an AR display device in accordance with one example embodiment.

FIG. 2 is a block diagram illustrating modules (e.g., components) of the display device 108, according to some example embodiments. The display device 108 includes sensors 202, a display 204, a processor 208, a rendering system 224, and a storage device 206. Examples of display device 108 include a head-mounted device, a wearable computing device, a desktop computer, a vehicle computer, a tablet computer, a navigational device, a portable media device, or a smart phone.

The sensors 202 include, for example, an optical sensor 214 (e.g., stereo cameras, camera such as a color camera, a thermal camera, a depth sensor and one or multiple grayscale, global shutter tracking cameras) and an inertial sensor 216 (e.g., gyroscope, accelerometer). Other examples of sensors 202 include a proximity or location sensor (e.g., near field communication, GPS, Bluetooth, Wi-Fi), an audio sensor (e.g., a microphone), or any suitable combination thereof. It is noted that the sensors 202 described herein are for illustration purposes and the sensors 202 are thus not limited to the ones described above.

The display 204 includes a screen or monitor configured to display images generated by the processor 208. In one example embodiment, the display 204 may be transparent or semi-transparent so that the user 106 can see through the display 204 (in AR use case). In another example, the display 204, such as a LCOS display, presents each frame of virtual content in multiple presentations.

The processor 208 operates an AR application 210, a 3D model engine 226, and a tracking system 212. The tracking system 212 detects and tracks the hands 114 and the physical object 112 using computer vision. The 3D model engine 226 constructs a 3D model of the physical object 112 and stores the 3D model data 228 in the storage device 206. The AR application 210 retrieves virtual content based on the 3D model of the physical object 112. The AR rendering system 224 renders the virtual object in the display 204. In an AR scenario, the AR application 210 generates annotations/virtual content that are overlaid (e.g., superimposed upon, or otherwise displayed in tandem with, and appear anchored to) on an image of the physical object 112 captured by the optical sensor 214. The annotations/virtual content may be manipulated by changing a pose of the physical object 112 (e.g., its physical location, orientation, or both) relative to the optical sensor 214. Similarly, the visualization of the annotations/virtual content may be manipulated by adjusting a pose of the display device 108 relative to the physical object 112.

The tracking system 212 estimates a pose of the display device 108 and/or the pose of the physical object 112. In one example, the tracking system 212 uses image data and corresponding inertial data from the optical sensor 214 and the inertial sensor 216 to track a location and pose of the display device 108 relative to a frame of reference (e.g., real-world environment 102). In one example, the tracking system 212 uses the sensor data to determine the three-dimensional pose of the display device 108. The three-dimensional pose is a determined orientation and position of the display device 108 in relation to the user's real-world environment 102. For example, the display device 108 may use images of the user's real-world environment 102, as well as other sensor data to identify a relative position and orientation of the display device 108 from physical objects in the real-world environment 102 surrounding the display device 108. The tracking system 212 continually gathers and uses updated sensor data describing movements of the display device 108 to determine updated three-dimensional poses of the display device 108 that indicate changes in the relative position and orientation of the display device 108 from the physical objects in the real-world environment 102. The tracking system 212 provides the three-dimensional pose of the display device 108 to the rendering system 224.

The rendering system 224 includes a Graphical Processing Unit 218 and a display controller 220. The Graphical Processing Unit 218 includes a render engine (not shown) that is configured to render a frame of a 3D model of a virtual object based on the virtual content provided by the AR application 210 and the pose of the display device 108. In other words, the Graphical Processing Unit 218 uses the three-dimensional pose of the display device 108 to generate frames of virtual content to be presented on the display 204. For example, the Graphical Processing Unit 218 uses the three-dimensional pose to render a frame of the virtual content such that the virtual content is presented at an appropriate orientation and position in the display 204 to properly augment the user's reality. As an example, the Graphical Processing Unit 218 may use the three-dimensional pose data to render a frame of virtual content such that, when presented on the display 204, the virtual content appears anchored to the physical object 112 in the user's real-world environment 102. The Graphical Processing Unit 218 generates updated frames of virtual content based on updated three-dimensional poses of the display device 108, which reflect changes in the position and orientation of the user 106 in relation to the physical object 112 in the user's real-world environment 102.

The Graphical Processing Unit 218 transfers the rendered frame to the display controller 220. The display controller 220 is positioned as an intermediary between the Graphical Processing Unit 218 and the display 204, receives the image data (e.g., annotated rendered frame) from the Graphical Processing Unit 218, provides the annotated rendered frame to the display 204.

The storage device 206 stores virtual object content 222 and 3D model data 228. The virtual object content 222 includes, for example, a database of visual references (e.g., images, QR codes) and corresponding virtual content (e.g., three-dimensional model of virtual objects). The 3D model data 228 is generated by the 3D model engine 226.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
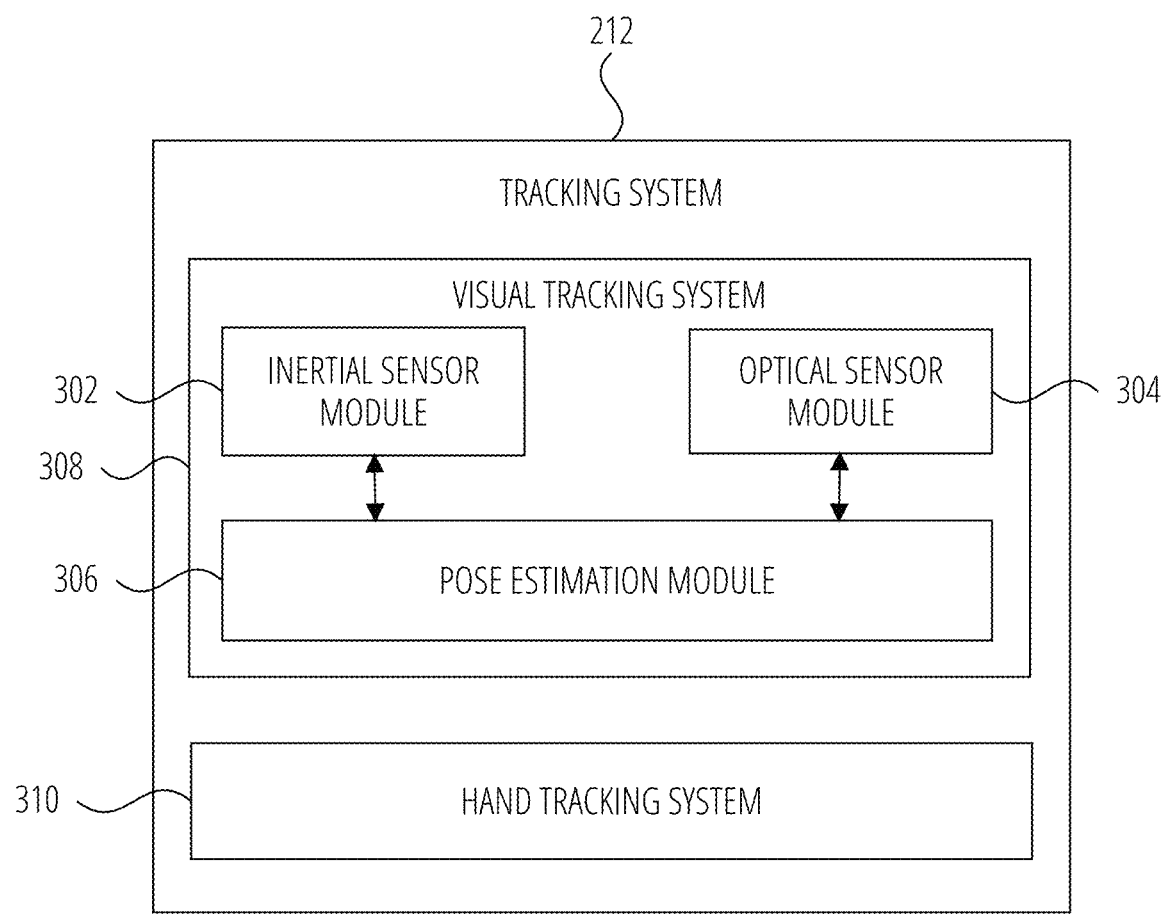
FIG. 3 is a block diagram illustrating a tracking system in accordance with one example embodiment.

FIG. 3 illustrates the tracking system 212 in accordance with one example embodiment. The tracking system 212 includes, for example, a visual tracking system 308 and a hand tracking system 310.

The visual tracking system 308 includes an inertial sensor module 302, an optical sensor module 304, and a pose estimation module 306. The inertial sensor module 302 accesses inertial sensor data from the inertial sensor 216. The optical sensor module 304 accesses optical sensor data from the optical sensor 214.

The pose estimation module 306 determines a pose (e.g., location, position, orientation) of the Display device 108 relative to a frame of reference (e.g., real-world environment 102). In one example embodiment, the pose estimation module 306 estimates the pose of the Display device 108 based on 3D maps of feature points from images captured by the optical sensor 214 (via an optical sensor module 304) and from the inertial sensor data captured by the inertial sensor 216 (via inertial sensor module 302).

In one example, the pose estimation module 306 includes an algorithm that combines inertial information from the inertial sensor 216 and image information from the optical sensor 214 that are coupled to a rigid platform (e.g., display device 108) or a rig. A rig may consist of multiple cameras (with non-overlapping (distributed aperture) or overlapping (stereo or more) fields-of-view) mounted on a rigid platform with an Inertial Measuring Unit, also referred to as IMU (e.g., rig may thus have at least one IMU and at least one camera).

The hand tracking system 310 operates a computer vision algorithm (e.g., hand tracking algorithm) to detect and track a location of a hand depicted in a frame captured by the optical sensor 214. In one example, the hand tracking system 310 detects and identify pixels corresponding to the hands 114 of the user 106 in an image captured with the optical sensor 214. The hand tracking system 310 labels and segments pixels in the images belonging to the hands 114.

Figure 4:
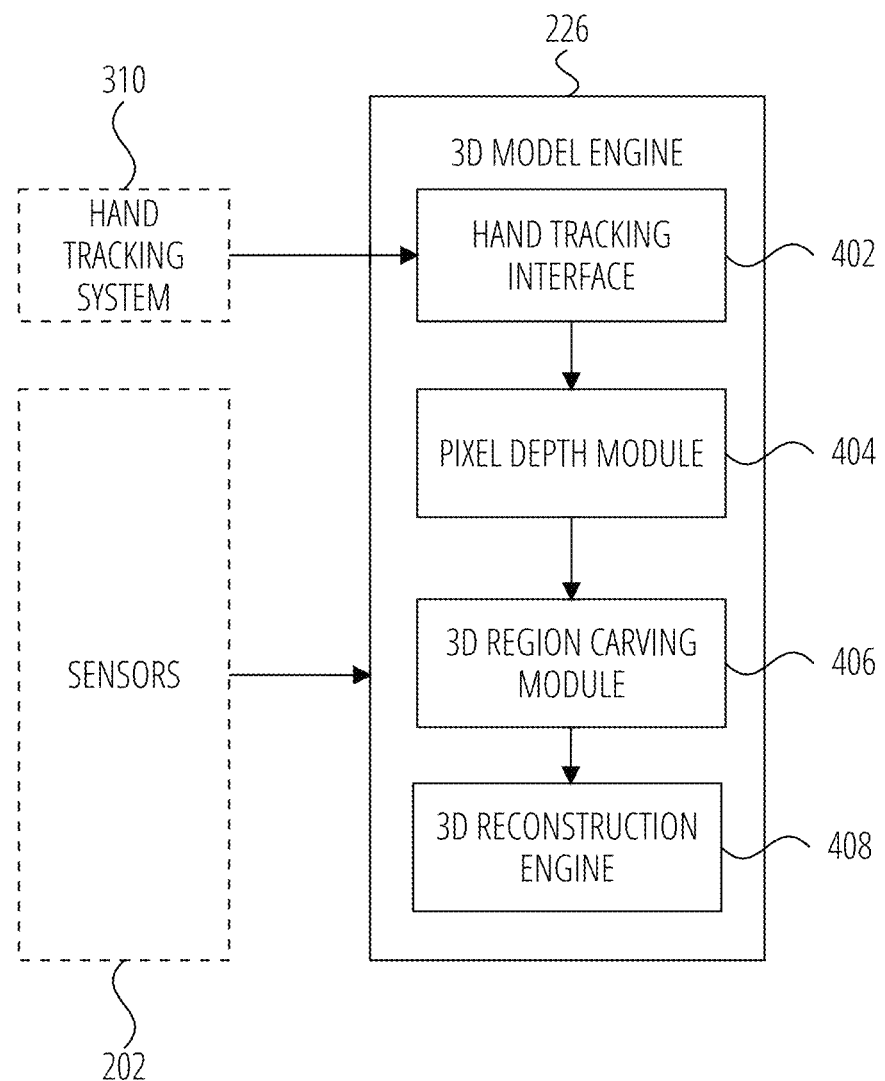
FIG. 4 is a block diagram illustrating a 3D model engine in accordance with one example embodiment.

FIG. 4 is a block diagram illustrating the 3D model engine 226 in accordance with one example embodiment. The 3D model engine 226 includes a hand tracking interface 402, a pixel depth module 404, a 3D region carving module 406, and a 3D reconstruction engine 408.

The hand tracking interface 402 communicates with the hand tracking system 310 and receives data identifying pixels corresponding to the hands 114 in the images generated by the optical sensor 214. In one example, the hand tracking interface 402 identifies pixels that are labeled for the hands 114. In another example, the hand tracking interface 402 accessed segmented pixels corresponding to the hands 114.

The pixel depth module 404 determines the depths of the labelled/segmented pixels identified from the hand tracking interface 402. In one example, the pixel depth module 404 determines the depths of the pixels by using techniques such as (1) a stereo or depth camera, and (2) contour matching of the tracked hands 114 in two images.

The 3D region carving module 406 identifies a 3D space based on the depths data generated by the pixel depth module 404. For example, the 3D space corresponding to an unoccupied 3D space between the optical sensor 214 and the hands 114. In another example, the 3D region carving module 406 carves out a 3D space including a 3D envelope/hull of the physical object 112 based on the movement of the hands 114. For example, the user 106 moves his/her hands 114 in front, behind, and adjacent to the physical object 112. The 3D region carving module 406 detects the 3D space based on the depths of the hands 114 when the users 106 moves his/her hands around (in front, behind, and adjacent) the physical object 112.

The 3D reconstruction engine 408 can be configured to construct or reconstruct a 3D model using point cloud data from the 3D space identified by 3D region carving module 406. The 3D reconstruction performed by the 3D reconstruction engine 408 may employ any image-based technique that reconstructs scene geometry in the form of depth maps and any surface reconstruction technique that takes a point set as input.

Figure 5:
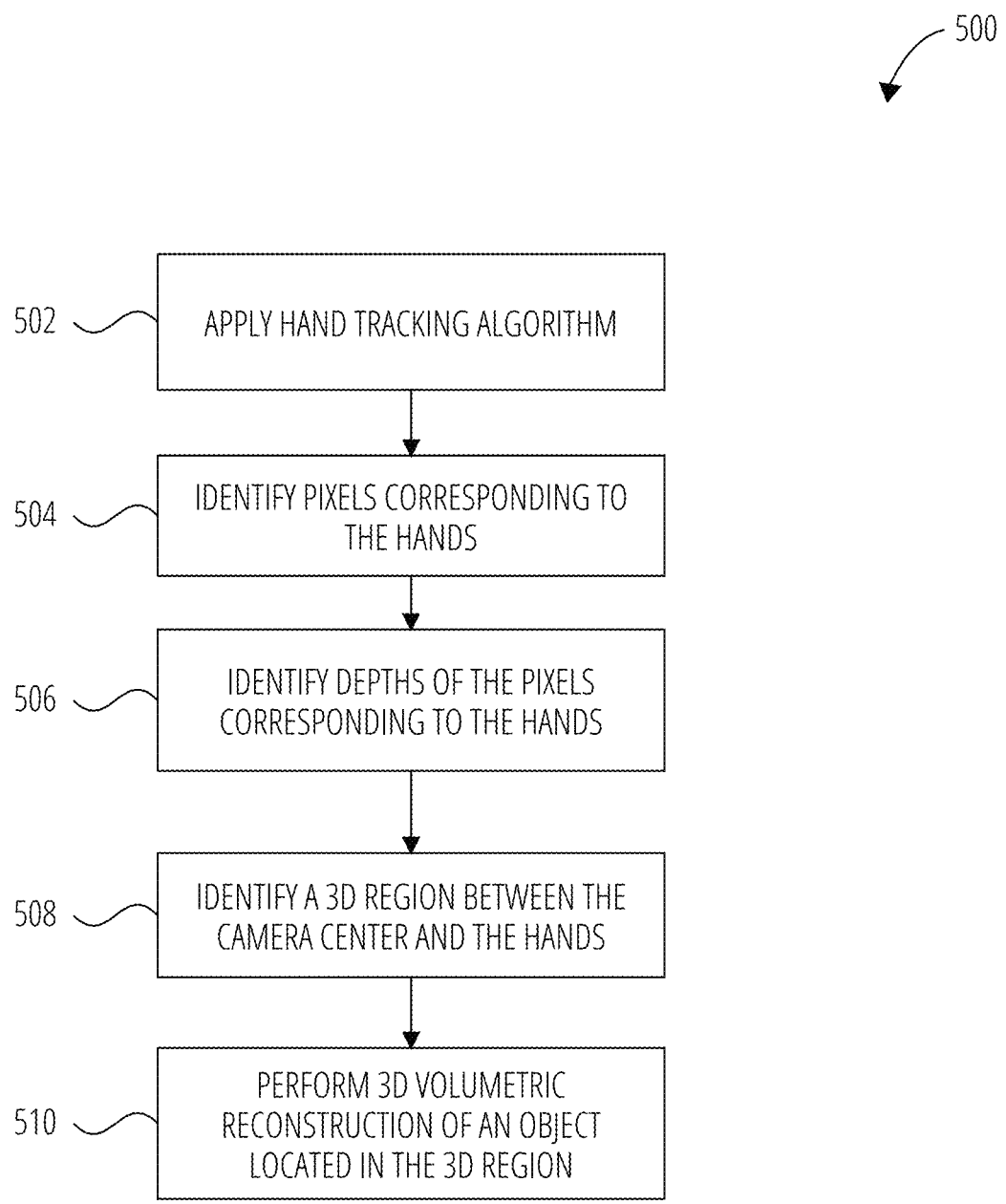
FIG. 5 is a flow diagram illustrating a method for identifying a 3D region in accordance with one example embodiment.

FIG. 5 is a flow diagram illustrating a method for identifying a 3D region in accordance with one example embodiment. Operations in the routine 500 may be performed by the tracking system 212 and the 3D model engine 226, using components (e.g., modules, engines) described above with respect to FIG. 2, FIG. 3, and FIG. 4. Accordingly, the routine 500 is described by way of example with reference to the tracking system 212 and 3D model engine 226. However, it shall be appreciated that at least some of the operations of the routine 500 may be deployed on various other hardware configurations or be performed by similar components residing elsewhere.

In block 502, the hand tracking system 310 operates a hand tracking algorithm to track hands 114 depicted in images generated by the optical sensor 214. In block 504, the hand tracking system 310 identifies pixels corresponding to the hands 114. In block 506, the pixel depth module 404 identifies depths of the pixels corresponding to the hands 114. In block 508, the 3D region carving module 406 identifies a 3D region between the optical sensor 214 and the hands 114. In block 510, the 3D reconstruction engine 408 performs 3D volumetric reconstruction of the physical object 112 located in the 3D region.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 6:
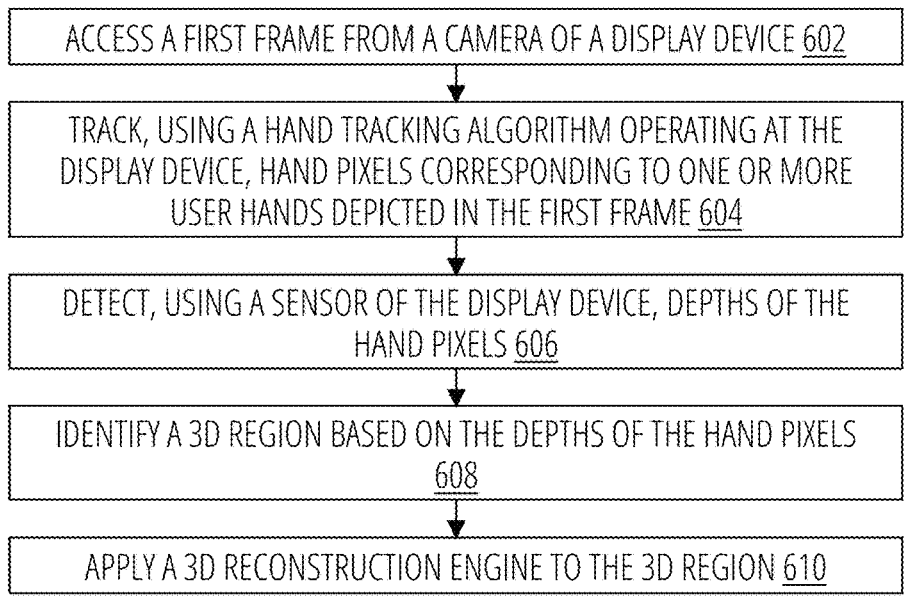
FIG. 6 illustrates a routine 600 in accordance with one example embodiment.

FIG. 6 illustrates a routine 600 in accordance with one example embodiment. In block 602, routine 600 accesses a first frame from a camera of a display device. In block 604, routine 600 tracks, using a hand tracking algorithm operating at the display device, hand pixels corresponding to one or more user hands depicted in the first frame. In block 606, routine 600 detects, using a sensor of the display device, depths of the hand pixels. In block 608, routine 600 identifies a 3D region based on the depths of the hand pixels. In block 610, routine 600 applies a 3D reconstruction engine to the 3D region.

Figure 7:
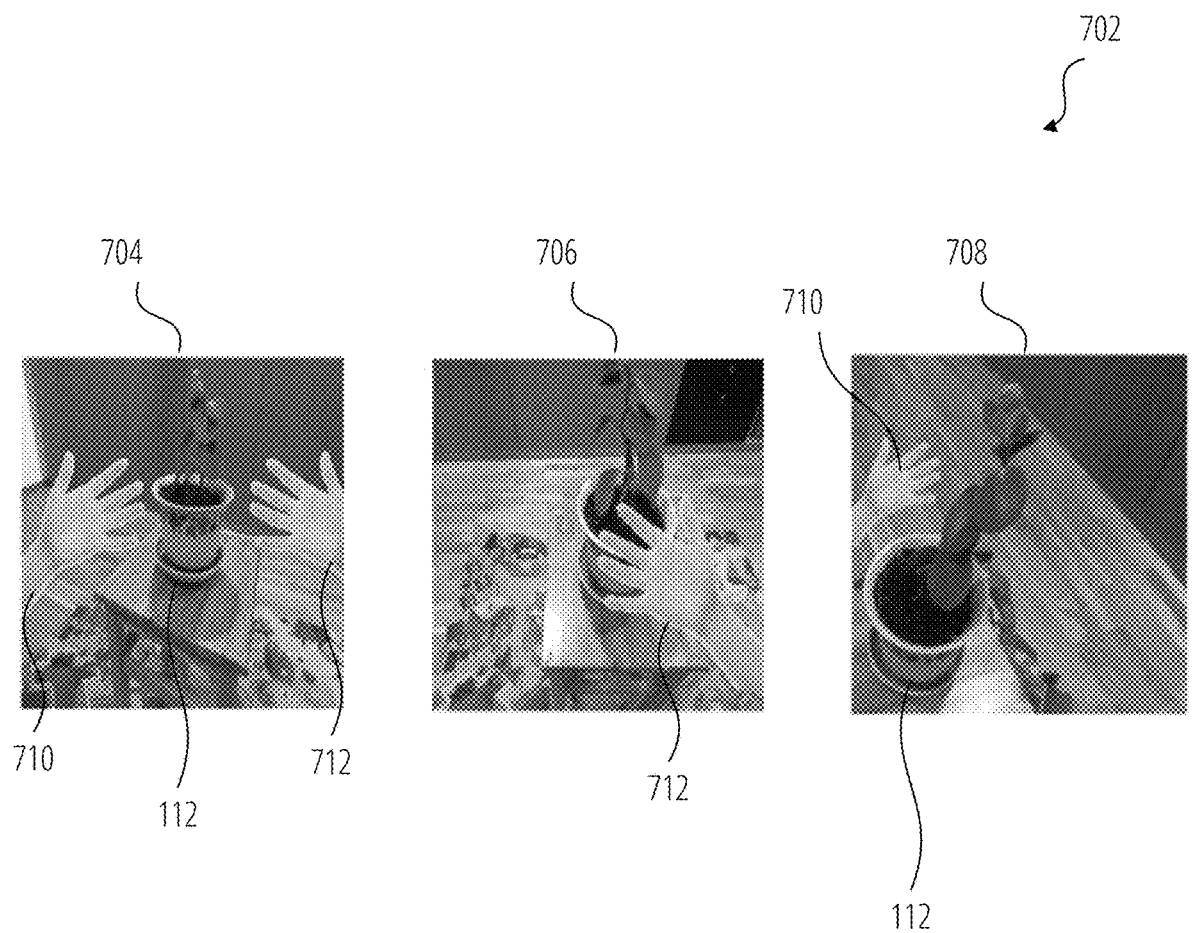
FIG. 7 illustrates an example of a sequence of hand motion in accordance with one example embodiment.

FIG. 7 illustrates an example of a sequence 702 of hand motion in accordance with one example embodiment. The image 704 depicts the left hand 710 and the right hand 712 (of the user 106) next to the physical object 112. The physical object 112 is located between the left hand 710 and the right hand 712. The image 706 depicts the right hand 712 in front of physical object 112. The image 708 depicts the left hand 710 behind/adjacent to the physical object 112.

Figure 8:
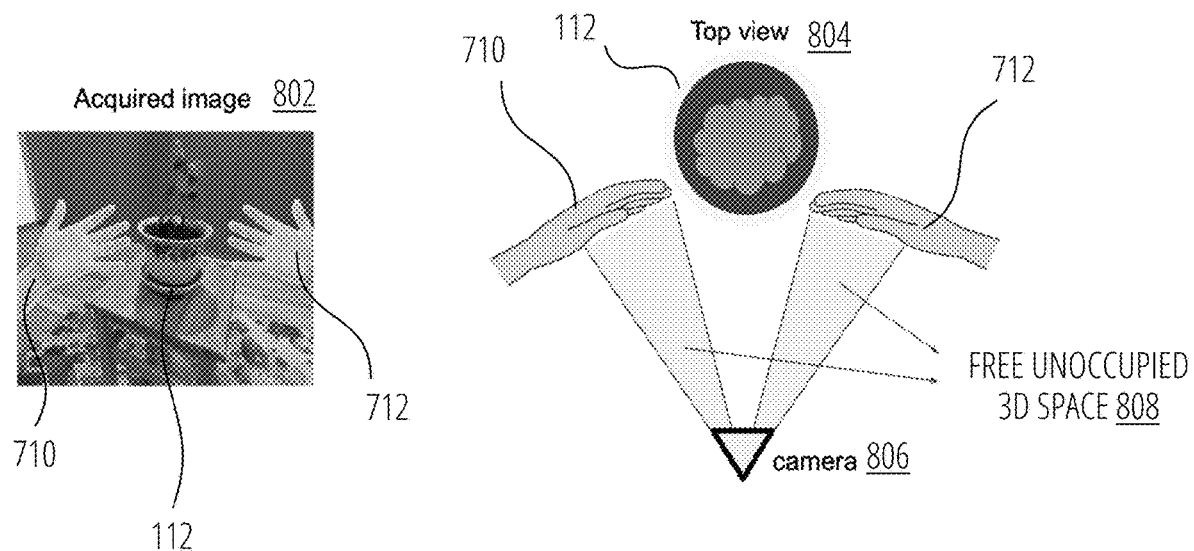
FIG. 8 illustrates a top view of hands detection in accordance with one example embodiment.

FIG. 8 illustrates a top view of hands detection in accordance with one example embodiment. The acquired image 802 depicts the physical object 112 in between the left hand 710 and the right hand 712. The top view 804 depicts the physical object 112 in between the left hand 710 and the right hand 712. The top view 804 also shows the free unoccupied 3D space 808 between the camera 806 and the left hand 710/right hand 712.

Figure 9:
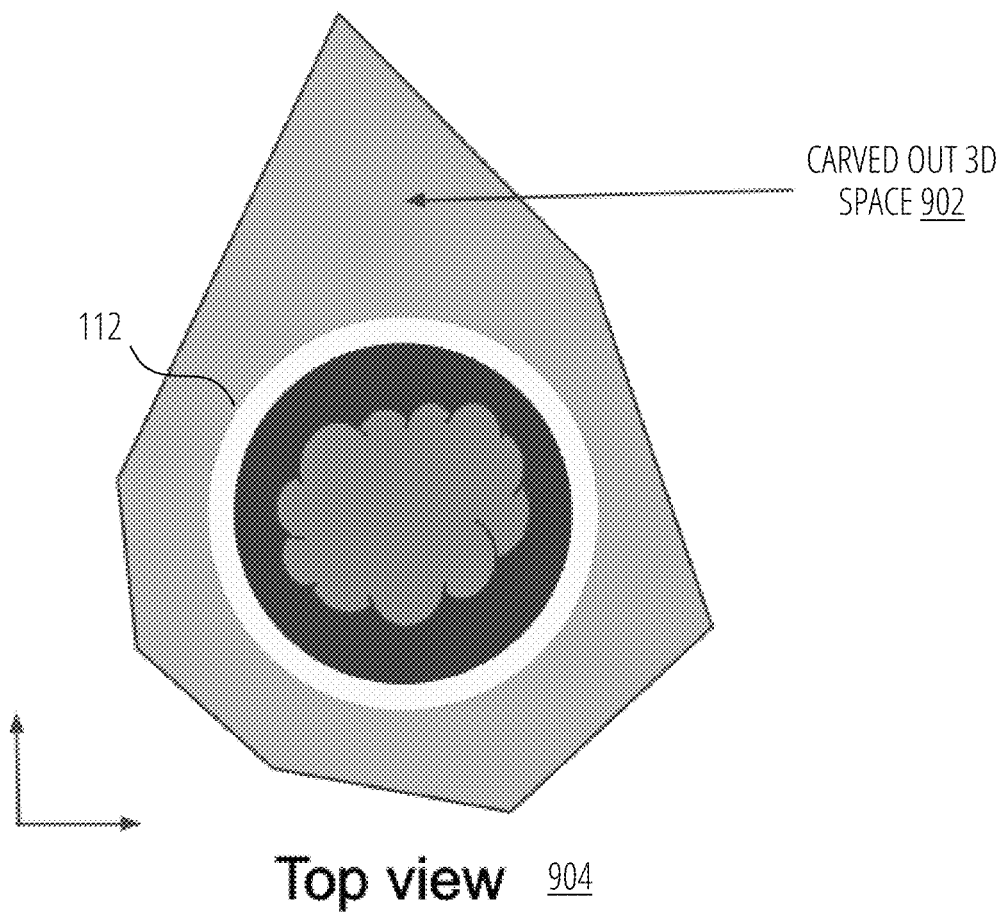
FIG. 9 illustrates an example of a 3D region in accordance with one example embodiment.

FIG. 9 illustrates an example of a 3D region (carved out 3D space 902) in accordance with one example embodiment. The carved out 3D space 902 is constructed/identified based on the depth data of the motion of the hands 114. The physical object 112 is located inside the carved out 3D space 902.

Figure 10:
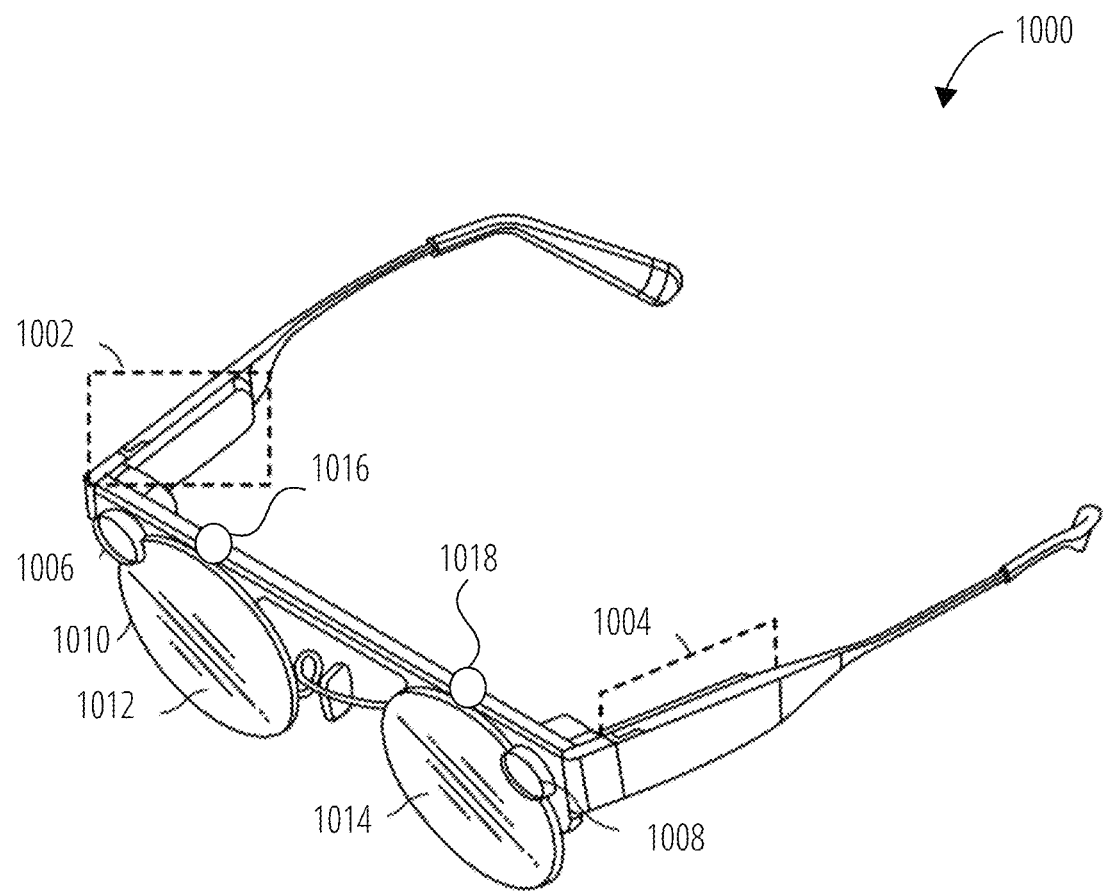
FIG. 10 illustrates a head-wearable apparatus 1000, according to one example embodiment

FIG. 10 illustrates a head-wearable apparatus 1000, according to one example embodiment. FIG. 10 illustrates a perspective view of the head-wearable apparatus 1000 according to one example embodiment. In some examples, the Display device 108 may be the head-wearable apparatus 1000.

In FIG. 10, the head-wearable apparatus 1000 is a pair of eyeglasses. In some embodiments, the head-wearable apparatus 1000 can be sunglasses or goggles. Some embodiments can include one or more wearable devices, such as a pendant with an integrated camera that is integrated with, in communication with, or coupled to, the head-wearable apparatus 1000 or a display device 108. Any desired wearable device may be used in conjunction with the embodiments of the present disclosure, such as a watch, a headset, a wristband, earbuds, clothing (such as a hat or jacket with integrated electronics), a clip-on electronic device, or any other wearable devices. It is understood that, while not shown, one or more portions of the system included in the head-wearable apparatus 1000 can be included in a Display device 108 that can be used in conjunction with the head-wearable apparatus 1000.

In FIG. 10, the head-wearable apparatus 1000 is a pair of eyeglasses that includes a frame 1010 that includes eye wires (or rims) that are coupled to two stems (or temples), respectively, via hinges and/or end pieces. The eye wires of the frame 1010 carry or hold a pair of lenses (e.g., lens 1012 and lens 1014). The frame 1010 includes a first (e.g., right) side that is coupled to the first stem and a second (e.g., left) side that is coupled to the second stem. The first side is opposite the second side of the frame 1010.

The head-wearable apparatus 1000 further includes camera lenses (e.g., camera lens 1006, camera lens 1008) and one or more proximity sensors (proximity sensor 1016, proximity sensor 1018). The camera lens 1006 and camera lens 1008 may be a perspective camera lens or a non-perspective camera lens. A non-perspective camera lens may be, for example, a fisheye lens, a wide-angle lens, an omnidirectional lens, etc. The image sensor captures digital video through the camera lens 1006 and camera lens 1008. The images may also be still image frames or a video including a plurality of still image frames. The camera module can be coupled to the frame 1010. As shown in FIG. 10, the frame 1010 is coupled to the camera lens 1006 and camera lens 1008 such that the camera lenses (e.g., camera lens 1006, camera lens 1008) face forward. The camera lens 1006 and camera lens 1008 can be perpendicular to the lens 1012 and lens 1014. The camera module can include dual-front facing cameras that are separated by the width of the frame 1010 or the width of the head of the user of the head-wearable apparatus 1000.

In FIG. 10, the two stems (or temples) are respectively coupled to microphone housing 1002 and microphone housing 1004. The first and second stems are coupled to opposite sides of a frame 1010 of the head-wearable apparatus 1000. The first stem is coupled to the first microphone housing 1002 and the second stem is coupled to the second microphone housing 1004. The microphone housing 1002 and microphone housing 1004 can be coupled to the stems between the locations of the frame 1010 and the temple tips. The microphone housing 1002 and microphone housing 1004 can be located on either side of the user's temples when the user is wearing the head-wearable apparatus 1000.

As shown in FIG. 10, the microphone housing 1002 and microphone housing 1004 encase a plurality of microphones (not shown). The microphones are air interface sound pickup devices that convert sound into an electrical signal. More specifically, the microphones are transducers that convert acoustic pressure into electrical signals (e.g., acoustic signals). Microphones can be digital or analog microelectro-mechanical systems (MEMS) microphones. The acoustic signals generated by the microphones can be pulse density modulation (PDM) signals.

Figure 11:
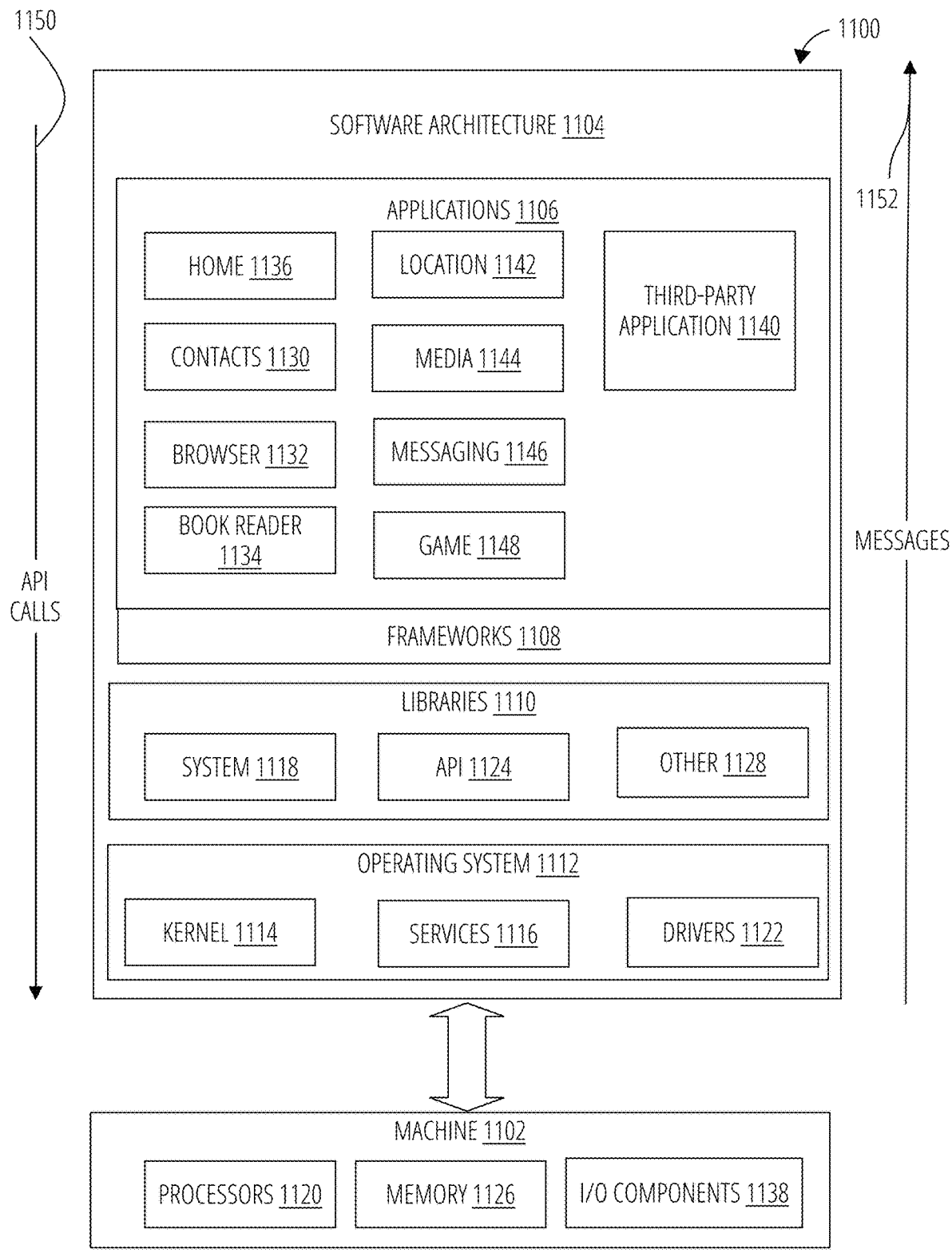
FIG. 11 is block diagram showing a software architecture within which the present disclosure may be implemented, according to an example embodiment.

FIG. 11 is a block diagram 1100 illustrating a software architecture 1104, which can be installed on any one or more of the devices described herein. The software architecture 1104 is supported by hardware such as a machine 1102 that includes Processors 1120, memory 1126, and I/O Components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, Processor management (e.g., scheduling), Component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1110 provide a low-level common infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a high-level common infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example embodiment, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or Linux OS, or other mobile operating systems. In this example, the third-party application 1140 can invoke the API calls 1150 provided by the operating system 1112 to facilitate functionality described herein.

Figure 12:
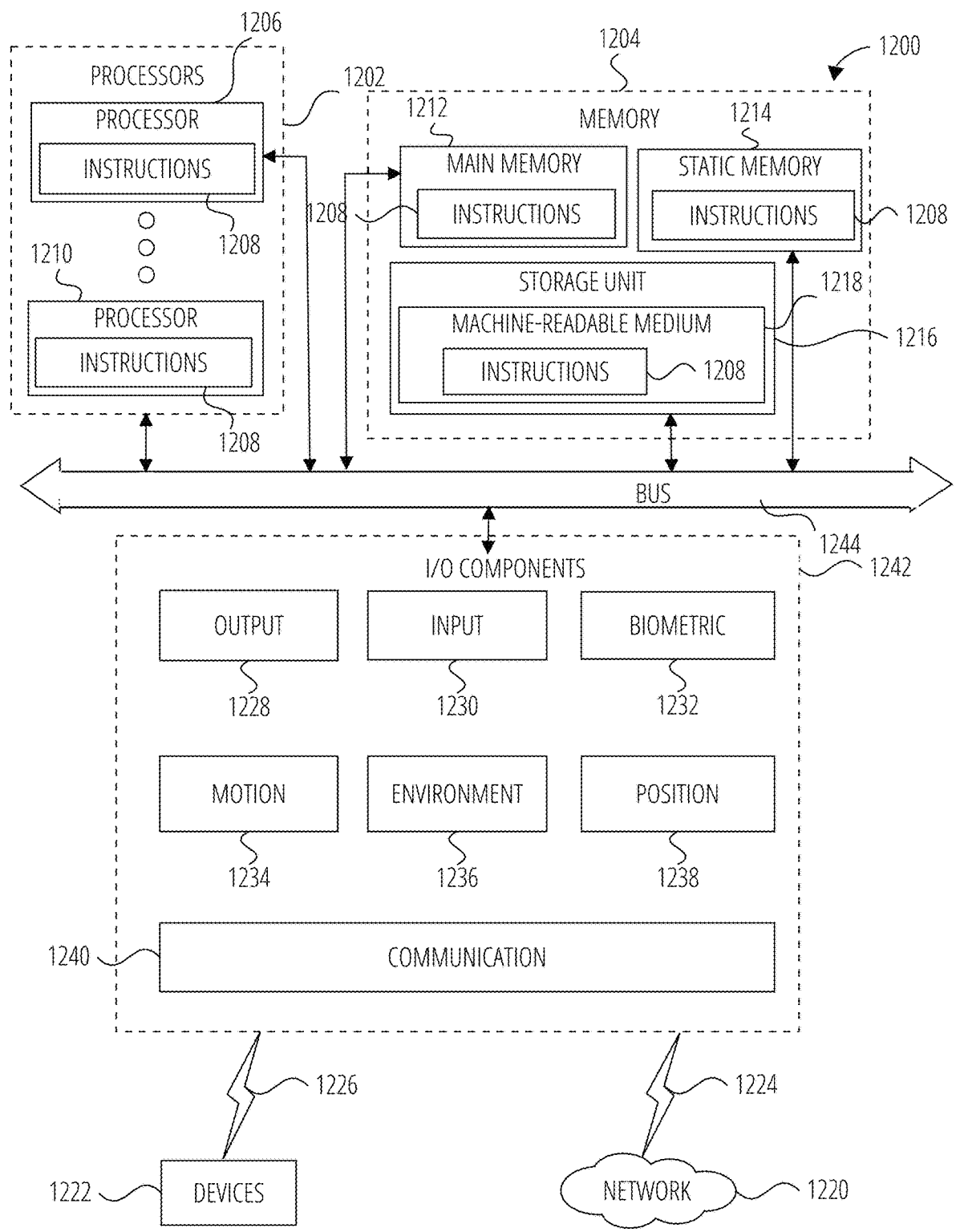
FIG. 12 is a diagrammatic representation of a machine in the form of a computer system within which a set of instructions may be executed for causing the machine to perform any one or more of the methodologies discussed herein, according to one example embodiment.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include Processors 1202, memory 1204, and I/O Components 1242, which may be configured to communicate with each other via a bus 1244. In an example embodiment, the Processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1206 and a Processor 1210 that execute the instructions 1208. The term "Processor" is intended to include multi-core Processors that may comprise two or more independent Processors (sometimes referred to as "cores") that may execute instructions contemporaneously. Although FIG. 12 shows multiple Processors 1202, the machine 1200 may include a single Processor with a single core, a single Processor with multiple cores (e.g., a multi-core Processor), multiple Processors with a single core, multiple Processors with multiples cores, or any combination thereof.

The memory 1204 includes a main memory 1212, a static memory 1214, and a storage unit 1216, both accessible to the Processors 1202 via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within the machine-readable medium 1218 within the storage unit 1216, within at least one of the Processors 1202 (e.g., within the Processor's cache memory), or any suitable combination thereof, during execution thereof by the machine 1200.

The I/O Components 1242 may include a wide variety of Components to receive input, provide output, produce output, transmit information, exchange information, capture measurements, and so on. The specific I/O Components 1242 that are included in a particular machine will depend on the type of machine. For example, portable machines such as mobile phones may include a touch input device or other such input mechanisms, while a headless server machine will likely not include such a touch input device. It will be appreciated that the I/O Components 1242 may include many other Components that are not shown in FIG. 12. In various example embodiments, the I/O Components 1242 may include output Components 1228 and input Components 1230. The output Components 1228 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1230 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1242 may include biometric Components 1232, motion Components 1234, environmental Components 1236, or position Components 1238, among a wide array of other Components. For example, the biometric Components 1232 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1234 include acceleration sensor Components (e.g., accelerometer), gravitation sensor Components, rotation sensor Components (e.g., gyroscope), and so forth. The environmental Components 1236 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1238 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1242 further include communication Components 1240 operable to couple the machine 1200 to a network 1220 or devices 1222 via a coupling 1224 and a coupling 1226, respectively. For example, the communication Components 1240 may include a network interface Component or another suitable device to interface with the network 1220. In further examples, the communication Components 1240 may include wired communication Components, wireless communication Components, cellular communication Components, Near Field Communication (NFC) Components, Bluetooth® Components (e.g., Bluetooth® Low Energy), WiFi® Components, and other communication Components to provide communication via other modalities. The devices 1222 may be another machine or any of a wide variety of peripheral devices (e.g., a peripheral device coupled via a USB).

Moreover, the communication Components 1240 may detect identifiers or include Components operable to detect identifiers. For example, the communication Components 1240 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the Processors 1202) and/or storage unit 1216 may store one or more sets of instructions and data structures (e.g., software) embodying or used by any one or more of the methodologies or functions described herein. These instructions (e.g., the instructions 1208), when executed by Processors 1202, cause various operations to implement the disclosed embodiments.

The instructions 1208 may be transmitted or received over the network 1220, using a transmission medium, via a network interface device (e.g., a network interface Component included in the communication Components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a method comprising: accessing a first frame from a camera of a display device; tracking, using a hand tracking algorithm operating at the display device, hand pixels corresponding to one or more user hands depicted in the first frame; detecting, using a sensor of the display device, depths of the hand pixels; identifying a 3D region based on the depths of the hand pixels; and applying a 3D reconstruction engine to the 3D region.

Example 2 includes the method of example 1, wherein the 3D region includes an unoccupied 3D space between the camera and the one or more user hands.

Example 3 includes the method of example 1, wherein the sensor includes a depth sensor or stereo cameras.

Example 4 includes the method of example 1, wherein detecting the depths is based on contour matching of the one or more user hands in two images.

Example 5 includes the method of example 1, wherein identifying the 3D region comprises: tracking a motion of the one or more user hands; and identifying a 3D envelope comprising a physical object based on the motion of the one or more user hands.

Example 6 includes the method of example 5, wherein applying the 3D reconstruction engine to the 3D region comprises: generating a 3D model of the physical object included in the 3D envelope based on point cloud data from the 3D envelope.

Example 7 includes the method of example 6, further comprising: identifying the physical object based on the 3D model of the physical object.

Example 8 includes the method of example 7, further comprising: identifying virtual content corresponding to the physical object or the 3D model of the physical object; and displaying, in a display of the display device, the virtual content as an overlay to the physical object.

Example 9 includes the method of example 1, wherein identifying the 3D region is based on a motion of the one or more user hands comprises: filtering a first portion of the first frame to identify a first area of interest based on a location of the one or more user hands in the first frame; filtering a second portion of a second frame to identify a second area of interest based on a location of the one or more user hands in the second frame; identifying first hand pixel depths of the one or more user hands in the first frame; identifying second hand pixel depths of the one or more user hands in the second frame; and identifying the 3D region based on the first area of interest, the second area of interest, the first hand pixel depths, and the second hand pixel depths.

Example 10 includes the method of example 1, wherein applying the 3D reconstruction engine to the 3D region comprises: excluding a 3D space outside the 3D region.

Example 11 is a computing apparatus comprising: a processor; and a memory storing instructions that, when executed by the processor, configure the apparatus to: access a first frame from a camera of a display device; track, using a hand tracking algorithm operating at the display device, hand pixels corresponding to one or more user hands depicted in the first frame; detect, using a sensor of the display device, depths of the hand pixels; identify a 3D region based on the depths of the hand pixels; and apply a 3D reconstruction engine to the 3D region.

Example 12 includes the computing apparatus of example 11, wherein the 3D region includes an unoccupied 3D space between the camera and the one or more user hands.

Example 13 includes the computing apparatus of example 11, wherein the sensor includes a depth sensor or stereo cameras.

Example 14 includes the computing apparatus of example 11, wherein detecting the depths is based on contour matching of the one or more user hands in two images.

Example 15 includes the computing apparatus of example 11, wherein identifying the 3D region comprises: track a motion of the one or more user hands; and identify a 3D envelope comprising a physical object based on the motion of the one or more user hands.

Example 16 includes the computing apparatus of example 15, wherein applying the 3D reconstruction engine to the 3D region comprises: generate a 3D model of the physical object included in the 3D envelope based on point cloud data from the 3D envelope.

Example 17 includes the computing apparatus of example 16, wherein the instructions further configure the apparatus to: identify the physical object based on the 3D model of the physical object.

Example 18 includes the computing apparatus of example 17, wherein the instructions further configure the apparatus to: identify virtual content corresponding to the physical object or the 3D model of the physical object; and display, in a display of the display device, the virtual content as an overlay to the physical object.

Example 19 includes the computing apparatus of example 11, wherein identifying the 3D region is based on a motion of the one or more user hands comprises: filter a first portion of the first frame to identify a first area of interest based on a location of the one or more user hands in the first frame; filter a second portion of a second frame to identify a second area of interest based on a location of the one or more user hands in the second frame; identify first hand pixel depths of the one or more user hands in the first frame; identify second hand pixel depths of the one or more user hands in the second frame; and identify the 3D region based on the first area of interest, the second area of interest, the first hand pixel depths, and the second hand pixel depths.

Example 20 is a non-transitory computer-readable storage medium, the computer-readable storage medium including instructions that when executed by a computer, cause the computer to: access a first frame from a camera of a display device; track, using a hand tracking algorithm operating at the display device, hand pixels corresponding to one or more user hands depicted in the first frame; detect, using a sensor of the display device, depths of the hand pixels; identify a 3D region based on the depths of the hand pixels; and apply a 3D reconstruction engine to the 3D region.

What is claimed is:

1. A method comprising:
accessing a first frame from a camera of a display device;
tracking, using a hand tracking algorithm operating at the display device, hand pixels corresponding to one or more user hands depicted in the first frame;
detecting, using a sensor of the display device, depths of the hand pixels;
tracking a motion of a left hand and a right hand of a user of the display device;
carving a 3D region that includes a 3D hull of a physical object based on the motion of the left hand and the right hand relative to the physical object;
identifying the 3D region based on the depths of the hand pixels; and
applying a 3D reconstruction engine to the 3D region.

2. The method of claim 1, wherein the 3D region includes an unoccupied 3D space between the camera and the one or more user hands.

3. The method of claim 1, wherein the sensor includes a depth sensor or stereo cameras.

4. The method of claim 1, wherein detecting the depths is based on contour matching of the one or more user hands in two images.

5. The method of claim 1, wherein carving the 3D region comprises:
detecting the 3D region between the left hand and right hand; and
identifying a 3D envelope comprising the physical object based on the motion of the left hand and the right hand, the motion of the left hand indicating a left side boundary of the 3D region, the right hand indicating a right side boundary of the 3D region.

6. The method of claim 5, wherein applying the 3D reconstruction engine to the 3D region comprises:
generating a 3D model of the physical object included in the 3D envelope based on point cloud data from the 3D envelope.

7. The method of claim 6, further comprising:
identifying the physical object based on the 3D model of the physical object.

8. The method of claim 7, further comprising:
identifying virtual content corresponding to the physical object or the 3D model of the physical object; and
displaying, in a display of the display device, the virtual content as an overlay to the physical object.

9. The method of claim 1, wherein identifying the 3D region is based on a motion of the one or more user hands comprises:
filtering a first portion of the first frame to identify a first area of interest based on a location of the one or more user hands in the first frame;
filtering a second portion of a second frame to identify a second area of interest based on a location of the one or more user hands in the second frame;
identifying first hand pixel depths of the one or more user hands in the first frame;
identifying second hand pixel depths of the one or more user hands in the second frame; and
identifying the 3D region based on the first area of interest, the second area of interest, the first hand pixel depths, and the second hand pixel depths.

10. The method of claim 1, wherein carving the 3D region comprises:
detecting the 3D region based on the motion of the left hand and the right hand, the left hand and right hand moving in front of the physical object, behind the physical object, and adjacent to the physical object.

11. A computing apparatus comprising:
a processor; and
a memory storing instructions that, when executed by the processor, configure the apparatus to:
access a first frame from a camera of a display device;
track, using a hand tracking algorithm operating at the display device, hand pixels corresponding to one or more user hands depicted in the first frame;
detect, using a sensor of the display device, depths of the hand pixels;
track a motion of a left hand and a right hand of a user of the display device;
carve a 3D region that includes a 3D hull of a physical object based on the motion of the left hand and the right hand relative to the physical object;
identify the 3D region based on the depths of the hand pixels; and
apply a 3D reconstruction engine to the 3D region.

12. The computing apparatus of claim 11, wherein the 3D region includes an unoccupied 3D space between the camera and the one or more user hands.

13. The computing apparatus of claim 11, wherein the sensor includes a depth sensor or stereo cameras.

14. The computing apparatus of claim 11, wherein detecting the depths is based on contour matching of the one or more user hands in two images.

15. The computing apparatus of claim 11, wherein carving the 3D region comprises:
detecting the 3D region between the left hand and right hand tracking; and
identifying a 3D envelope comprising the physical object based on the motion of the left hand and the right hand, the motion of the left hand indicating a left side boundary of the 3D region, the right hand indicating a right side boundary of the 3D region.

16. The computing apparatus of claim 15, wherein applying the 3D reconstruction engine to the 3D region comprises:
generate a 3D model of the physical object included in the 3D envelope based on point cloud data from the 3D envelope.

17. The computing apparatus of claim 16, wherein the instructions further configure the apparatus to:
identify the physical object based on the 3D model of the physical object.

18. The computing apparatus of claim 17, wherein the instructions further configure the apparatus to:
identify virtual content corresponding to the physical object or the 3D model of the physical object; and
display, in a display of the display device, the virtual content as an overlay to the physical object.

19. The computing apparatus of claim 11, wherein identifying the 3D region is based on a motion of the one or more user hands comprises:
filter a first portion of the first frame to identify a first area of interest based on a location of the one or more user hands in the first frame;
filter a second portion of a second frame to identify a second area of interest based on a location of the one or more user hands in the second frame;
identify first hand pixel depths of the one or more user hands in the first frame;
identify second hand pixel depths of the one or more user hands in the second frame; and
identify the 3D region based on the first area of interest, the second area of interest, the first hand pixel depths, and the second hand pixel depths.

20. A non-transitory computer-readable storage medium, the computer-readable storage medium including instructions that when executed by a computer, cause the computer to:
access a first frame from a camera of a display device;
track, using a hand tracking algorithm operating at the display device, hand pixels corresponding to one or more user hands depicted in the first frame;
detect, using a sensor of the display device, depths of the hand pixels;
track a motion of a left hand and a right hand of a user of the display device;
carve a 3D region that includes a 3D hull of a physical object based on the motion of the left hand and the right hand relative to the physical object;
identify the 3D region based on the depths of the hand pixels; and
apply a 3D reconstruction engine to the 3D region.

* * * * *

UNITED STATES PATENT AND TRADEMARK OFFICE
CERTIFICATE OF CORRECTION

| | | |
|---|---|---|
| PATENT NO. | : 12,260,567 B2 | Page 1 of 1 |
| APPLICATION NO. | : 17/973167 | |
| DATED | : March 25, 2025 | |
| INVENTOR(S) | : Micusik et al. | |

It is certified that error appears in the above-identified patent and that said Letters Patent is hereby corrected as shown below:

On the Title Page

In Column 2, under "Other Publications", Line 1, delete "ValliNo." and insert --Vallino.-- therefor In the Claims In Column 17, Line 32, in Claim 15, delete "hand tracking;" and insert --hand;-- therefor Signed and Sealed this
Sixth Day of January, 2026

John A. Squires
*Director of the United States Patent and Trademark Office*